UNITED STATES PATENT OFFICE.

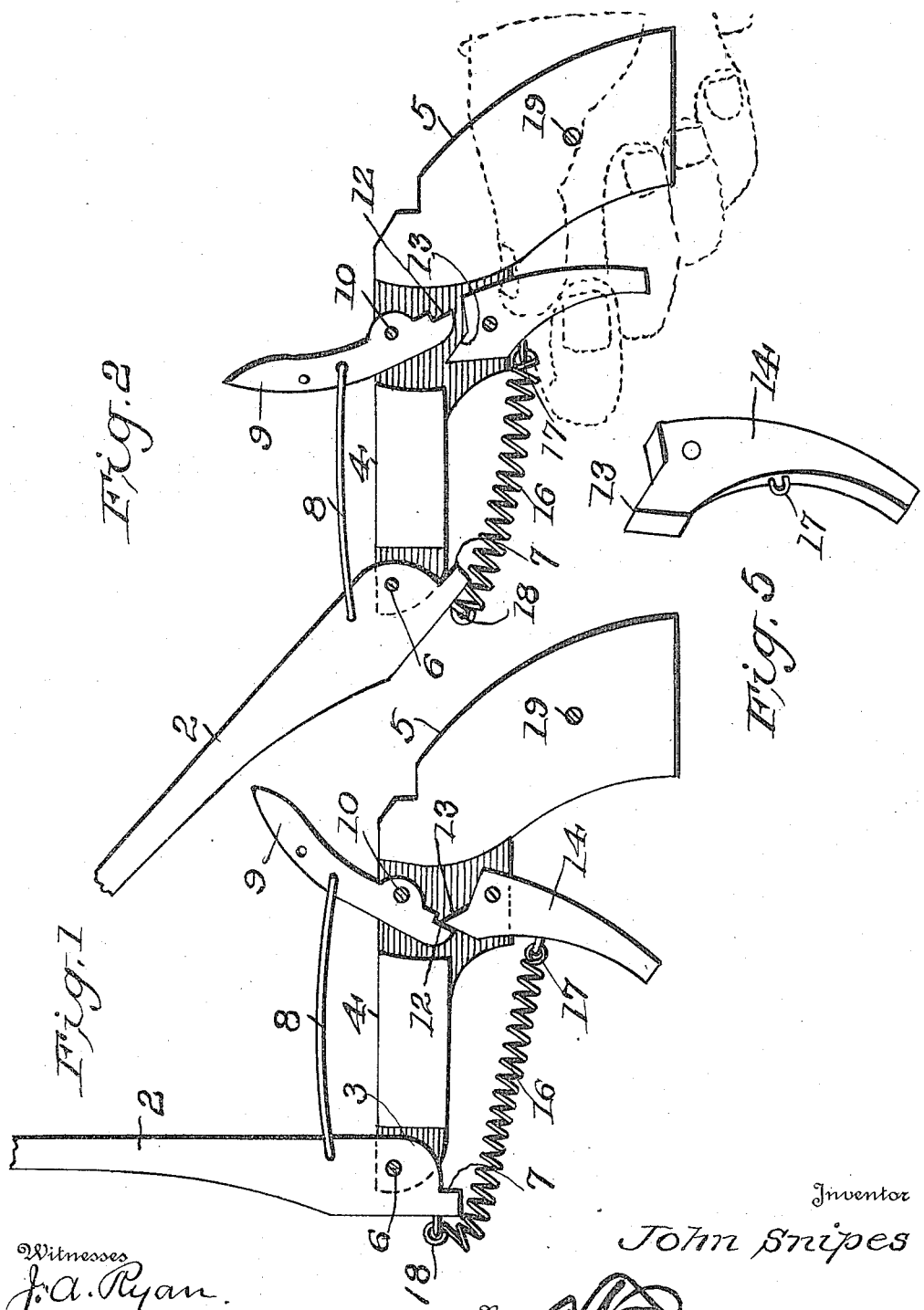

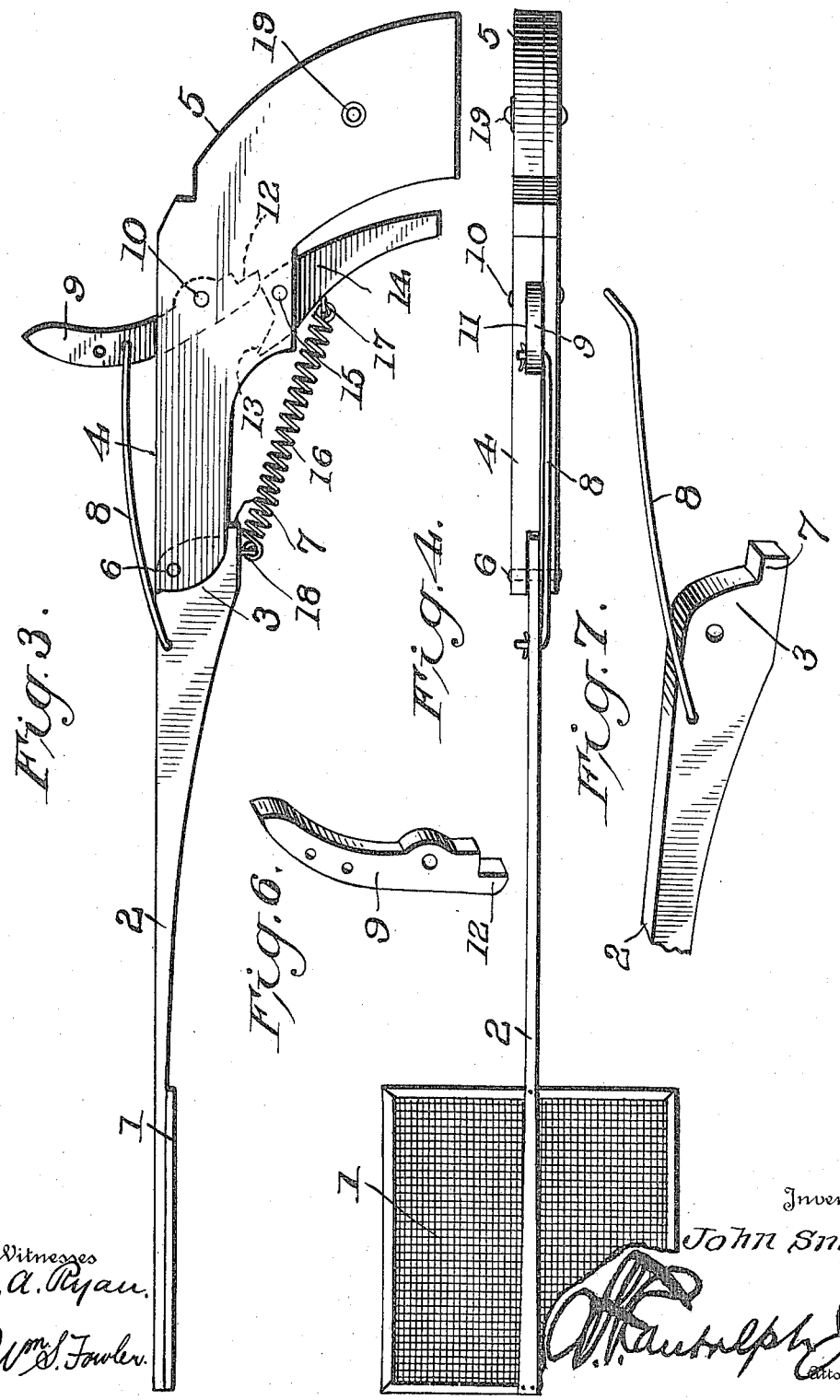

JOHN SNIPES, OF CHARLOTTE, NORTH CAROLINA.

INSECT-DESTROYING DEVICE.

1,152,234.  Specification of Letters Patent.  Patented Aug. 31, 1915.

Application filed September 25, 1914.  Serial No. 863,574.

*To all whom it may concern:*

Be it known that I, JOHN SNIPES, a citizen of the United States, residing at Charlotte, in the county of Mecklenburg and State of North Carolina, have invented certain new and useful Improvements in Insect-Destroying Devices; and I do hereby declare the following to be a full, clear, and exact description of the invention, such as will enable others skilled in the art to which it appertains to make and use the same.

This invention comprehends certain new and useful improvements in insect destroying devices and has for its primary object to provide a device of this character which will be constructed in such manner that it may be readily operated to destroy flies and other insects.

The invention has for another object to provide a device of this character which will be of simple construction and operation and which will include a pivoted arm carrying the fly swat, a trigger for operating the pivoted arm and means for locking the trigger in set position.

The invention has for a further object to provide a device of this character which will be composed of the minimum number of parts of simple formation and operation, whereby the device may be manufactured at an extremely small cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a longitudinal section through the device with the trigger locked in shut position, the forward portion of the pivoted arm being broken away, Fig. 2 is a view similar to Fig. 1, showing the manner in which the device is operated, the pivoted arm as well as the locking hammer for the trigger being shown between their two extreme positions. Fig. 3 is a side elevation of the complete device after the same has been operated, Fig. 4 is a top plan view of the device after operation of the same, Fig. 5 is an enlarged detail perspective view of the trigger, Fig. 6 is a similar view of the locking hammer, and Fig. 7 is a detail perspective view of the inner end of the pivoted arm and the rod for connecting said pivoted arm with the trigger locking hammer.

Referring in detail to the drawings by numerals, 1 designates a fly swat formed of wire mesh or other suitable material and secured upon the forward end of the pivoted arm 2 which has its enlarged inner end 3 pivoted between the forward ends of the parallel sections 4 forming the handle 5, a suitable pivot pin 6 being forced through the forward extended ends of the handle 5 and through the enlarged inner end of the pivoted arm 2 adjacent the upper corner thereof. A rearwardly directed stop lug 7 is formed on the pivoted lever 2 for engagement with the underface of the extended portion of the handle 5 to limit downward swinging movement of said pivoted arm 2, as will be readily understood by refering to the drawings.

When it is desired to set the device, the pivoted arm 2 is swung upon the pivot pin 6 to upright position by means of the connecting rod 8 which is pivoted in the pivoted arm 2 adjacent the rear or inner end thereof and also pivoted to the trigger locking hammer 9 above the horizontal portion of the handle 5 and above the pivot pin 10 which extends through the trigger locking hammer 9 and through the handle 5 adjacent the curved portion thereof, it being understood that a lower portion of the trigger locking hammer 9 is positioned in the recess 11 formed in the inner face of one of the sections 4 forming the handle 5.

The trigger locking hammer 9 has a depending locking lip 12 for engagement with the upstanding nose 13 of the trigger 14 to lock the latter in shut position, as will presently be clearly apparent. The trigger 14 is also positioned in the recess 11 and depends from the same in front of the downwardly curved rear end of the handle 5, the trigger 14 being mounted upon the pivot pin 15 extended transversely through the upper rear corner thereof adjacent the lower end of the recess 11. The trigger 14 is connected with the pivoted arm 2 by means of a suitable spiral contractile spring 16 which has one end pivoted to the trigger adjacent the upper end thereof, as shown at 17, while the opposite end of the spring is pivoted to the pivoted arm 2 adjacent the rear end thereof and upon the underface of said pivoted arm, as shown at 18, whereby the forward end of the spring will be rearwardly of the pivot pin 6 when the operative parts of the device are in operated position and the pivoted arm 2 is in extended or horizontal position in alinement with the forwardly extended portion of the handle 5 and when the parts are in this position the spring is practically compressed. As soon as the trigger locking hammer 9 is swung upon the pivot pin 10 to operative position, however, the pivoted arm 2 is swung upon the pivot pin 6 by means of the connecting rod 8 after the pivoted arm 2 is in substantially upright position. During movement of the parts to operative or set position, the trigger 14 is swung upon its pivot pin 15 until the nose thereof automatically engages behind the locking lip 12 of the hammer 9 and the spring 16 is placed under tension as the forward end thereof is moved to position in front of the forwardly directed portion of the handle 5, as clearly shown in Fig. 1. It will be evident that when the parts are in this position, the spring 16 will tend to draw the trigger 14 forwardly and pull downwardly upon the pivoted arm 2, thereby forcing the locking lip 12 of the hammer 9 and the nose 13 of the trigger 14 tightly against one another and preventing the pivoted arm 2 from swinging downwardly upon its pivot pin 6.

To operate the device, the handle 5 is brought around its downwardly curved portion and the trigger 14 grasped by the index finger and drawn toward the downwardly curved portion of the handle 5, as clearly shown in Fig. 2. This movement of the trigger 14 upon the pivot pin 15 will disengage the nose 13 of the trigger 14 from the depending locking lip 12 of the hammer 9, and will also exert a pull upon the spring 13, causing the same to swing the pivoted arm 2 downwardly upon its pivot pin 6.

It will be understood that the parallel sections 4 of the handle 5 may be secured together by any suitable means, such as shown at 19, and it will be evident that this device may be readily operated by children as well as grown persons and will be effective as well as durable, as the spring 16 will swing the arm 2 downwardly suddenly, thereby giving the insect no chance to escape.

While I have shown and described the preferred embodiment of my invention, it will be understood that minor changes in the details of construction, combination and arrangement of parts may be made without departing from the spirit and scope of the invention as claimed, or sacrificing any of the advantages thereof.

What is claimed is:—

A device of the class described comprising a handle, a trigger pivoted in said handle, a trigger locking member pivoted in said handle and adapted to lock the trigger in set position, a pivoted arm, connections between the pivoted arm and the trigger locking member, and resilient connections between the pivoted arm and the trigger to operate the pivoted arm upon operation of the trigger.

In testimony whereof I affix my signature in presence of two witnesses.

JOHN SNIPES.

Witnesses:
ODOM ALEXANDER,
F. M. SIMMONS.

Copies of this patent may be obtained for five cents each, by addressing the "Commissioner of Patents, Washington, D. C."